United States Patent [19]

Yim

[11] Patent Number: 4,970,493

[45] Date of Patent: Nov. 13, 1990

[54] VEHICLE SIGNALLING SYSTEM

[76] Inventor: Ki T. Yim, 2580 W. Venice Blvd., Los Angeles, Calif. 90019

[21] Appl. No.: 371,270

[22] Filed: Jun. 26, 1989

[51] Int. Cl.$^5$ .............................................. B60Q 1/34
[52] U.S. Cl. .................................... 340/468; 340/463; 340/464; 340/431
[58] Field of Search ............... 340/464, 431, 463, 479, 340/473, 472, 468, 467; 200/61.89, 86.5

[56] References Cited

U.S. PATENT DOCUMENTS

| | | | |
|---|---|---|---|
| 2,076,275 | 4/1937 | Jorgenson | 340/479 X |
| 2,435,389 | 2/1948 | Good | 200/61.89 |
| 2,707,214 | 4/1955 | Kaleba et al. | 200/61.89 |
| 2,740,105 | 3/1956 | Dorfman et al. | 340/464 X |
| 2,975,401 | 3/1961 | Shupe | 340/431 |
| 3,281,786 | 10/1966 | Leichsenring | 340/464 |
| 3,460,089 | 8/1969 | Gregory | 340/479 X |
| 3,474,411 | 10/1969 | Collins | 340/473 |
| 4,013,996 | 3/1977 | Hubbard | 340/463 |
| 4,034,338 | 7/1977 | Bevilacqua | 340/464 |
| 4,470,036 | 9/1984 | Doerr et al. | 340/464 |
| 4,558,194 | 12/1985 | Wiblin | 200/61.89 |

FOREIGN PATENT DOCUMENTS 8701342  3/1987  World Int. Prop. O. .......... 340/463

Primary Examiner—Joseph A. Orsino
Assistant Examiner—Brian R. Tumm
Attorney, Agent, or Firm—Julius L. Rubinstein

[57] ABSTRACT

A lighting system for a motor vehicle is provided with switches which can be removably attached to the gas and accelerator pedals of a motor vehicle. A lighting circuit is connected to these switches and when the accelerator pedal is pressed, a green light goes on. When driver of the motor vehicle turns on the motor or removes his foot from the accelerator, an amber light goes on. When the driver of the motor vehicle puts his foot on the brake pedal red brake lights blink on and off. A switch is attached to the vehicle gear shift lever in such a way that when the gear shift lever is moved to the reverse position, all or at least the brake lights of the vehicle turn on and start to blink.

4 Claims, 2 Drawing Sheets

VEHICLE SIGNALLING SYSTEM

This invention broadly relates to an auxiliary signaling system for motor vehicles, and more particularly to auxiliary signal lights which are designed to be permanently or releasably attached to the rear of motor vehicles or to the rear of trailers for indicating the intention of the driver. This invention was not made with the aid of any Federally sponsored research.

BACKGROUND OF THE INVENTION AND BRIEF SUMMARY

As automobiles have become more complex the number of lights on the rear of the vehicle has become more confusing. In the past some signaling devices have been provided which actuate red, green or amber lights to indicate the intention of the driver. But the prior signaling devices were comparatively complicated, and they relied on lights that were built into the motor vehicle and so they were not suitable for add-on use for vehicles already in service or for attachment to trailers being towed by vehicles.

These devices were often operated by using the accelerator or brake pedal actuated switches causing the various lights in the car to go "on" or "off". Other devices had means for causing an intensification of the brightness in the rear brake lights, to warn following vehicles that the driver has depressed the brakes of his vehicle. Due to the number of lights on the rear of the vehicle, the increase in the intensity of the brake lights when the brakes were applied was not very noticeable, particularly in hazy of foggy weather or when approaching vehicles to the rear were driving into the sun. More recently an additional red light has been mounted at eye level on the rear window of some new cars, but this light is not much of an improvement over the lights on lower rear of these cars for the same reason.

CROSS REFERENCE RELATED PATENTS

One approach, as exemplified by the patent to Antunovic #3,375,496, discloses a deceleration indicator for motor vehicles which is mounted on the rear of the vehicle, and like other devices, indicates when the driver has taken his foot off the accelerator.

Another approach, as indicated by the patent to Knopf #3,787,808, provides lights which indicate when the driver of the vehicle has taken his foot off the accelerator, and other lights indicate when the driver of the vehicle has pressed the brake pedal. In addition he has illuminated legends under the lights so that operators of approaching motor vehicles in the rear can read English, they can determine the intention of the driver.

Another approach as indicated by the patent to Doerr, #4,470,036, utilizes separate lights mounted on the rear window which indicate when the driver of the vehicles has taken his foot off the accelerator pedal, and when the accelerator pedal is being pressed. When the gas pedal is being pressed, a green light comes on, and when the brake pedal is being pressed a red light comes on. The sequence of lights is controlled by means of an accelerometer.

The patent to Camp #4,280,116 discloses another approach to a signaling system for vehicles. This complex system also utilizes a sequential signaling device wherein the position of a sequential type switch mounted in a barrel, is controlled by the gas pedal or the rocker arm of the carburetor.

The patent to Ostrowski #4,224,598, discloses a reaction signal device for automobiles which operates so that when the driver's foot is taken off the accelerator pedal, amber lights go on. When brakes are applied the amber lights go off and the red brake lights go on. When the driver releases the brake pedal the red or brake lights go off and the amber lights go on, until the accelerator pedal is again pressed and then the amber lights go off to repeat the cycle.

Still another approach to automobile signaling devices is shown in the patent to Petrella #2,750,578 wherein it appears that when the accelerator pedal is pressed, the red lights go on to warn vehicles in the rear that the vehicle is stopping.

SUMMARY OF THE INVENTION

However none of the references cited above are designed as auxiliary signal lights which can be easily mounted on or disconnected from existing motor vehicles. In addition the existing vehicle signaling systems do not adequately warn both oncoming motorists and following motorists of the intention of the driver. This is because they do not indicate what the vehicle is doing, e.g. backing up or stopped.

Many vehicles on the road today are provided with built in blinker lights which are connected to the lights in the motor vehicle and cause them to blink on and off to warn of a hazardous condition. However the blinker lights are usually separately controlled by a switch so that if the motorist is backing up he must remember to operate the hazard light switch However, the driver often forgets to do this because a possible hazard does not appear at the moment the vehicle is backing up.

In the present invention, auxiliary signal lights which are detachably connected to the light system of motor vehicle are actuated by switches which close or open when the accelerator or brake pedals of the vehicle are pressed or released from pressure. Since the signal lights are detachable they can be mounted on the back of rental trailers or mounted on existing vehicles. In addition, in the present invention, the built-in vehicle blinker circuit or an auxiliary blinker circuit may be used to cause the rear auxiliary lights and/or the built in vehicle lights to blink when the brakes are applied or when the vehicle gear shift lever is put in the reverse position.

What is needed, therefore, and comprises an important object of this invention is to provide an auxiliary vehicle signaling system which can be easily attached or detached from existing motor vehicles and wherein the hazard blinking lights go on automatically whenever the driver puts the shift lever in reverse or applies the brakes.

Another important object of this invention is to provide a simple auxiliary signaling system that can be easily attached or detached from existing motor vehicles and which comprises a plurality of lights that can be mounted in a single housing or in a plurality of scattered differently colored lights at the rear of the motor vehicle or trailer, and which indicate whether the motor vehicle is accelerating, coasting, braking, or going in reverse.

Still another object of this invention is to provide a simple signaling device in which auxiliary lights removably mounted on the vehicle have switches which can be easily and removably attached to the brake and accelerator pedals in the motor vehicle and which cause all the lights in the vehicle including the auxiliary signaling lights to flash or blink to warn both oncoming and following motorists that the driver has applied his brakes or put the gear shift lever in reverse.

These and other objects of this invention will become more apparent when better understood in the light of the accompany specification and drawings wherein:

FIG. 1 discloses a perspective view of the rear of the motor vehicle, which in the embodiment shown, has the auxiliary signaling lights mounted on the rear window of the motor vehicle.

Figure 4:
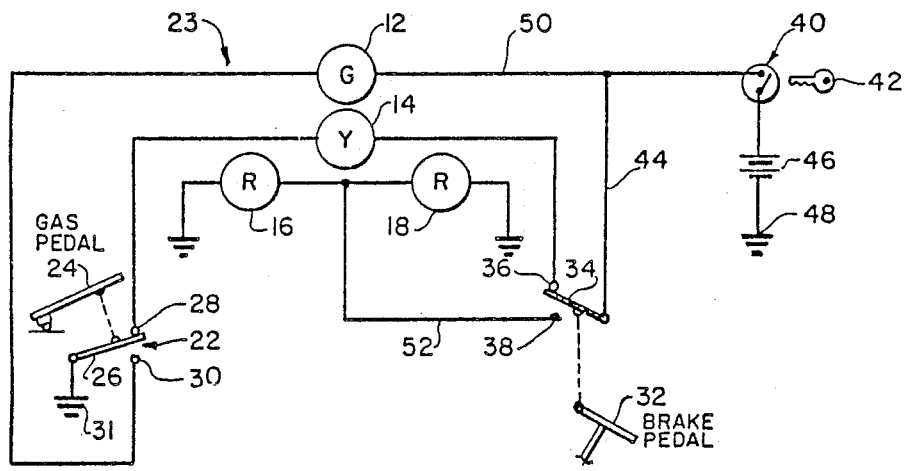

FIG. 4 discloses one electrical circuit which is designed to turn on the auxiliary yellow, green, or red lights depending on whether the driver's foot is depressing, or not pressing a pedal.

Figure 5:
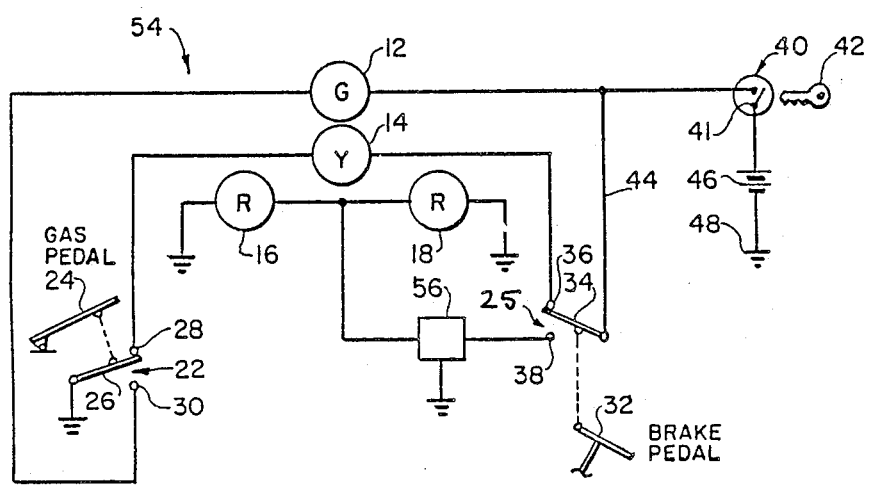

FIG. 5 discloses an electrical circuit like the one shown in FIG. 4 wherein the red auxiliary lights on the rear window of the vehicle blink whenever the brake pedal is pressed.

Figure 6:
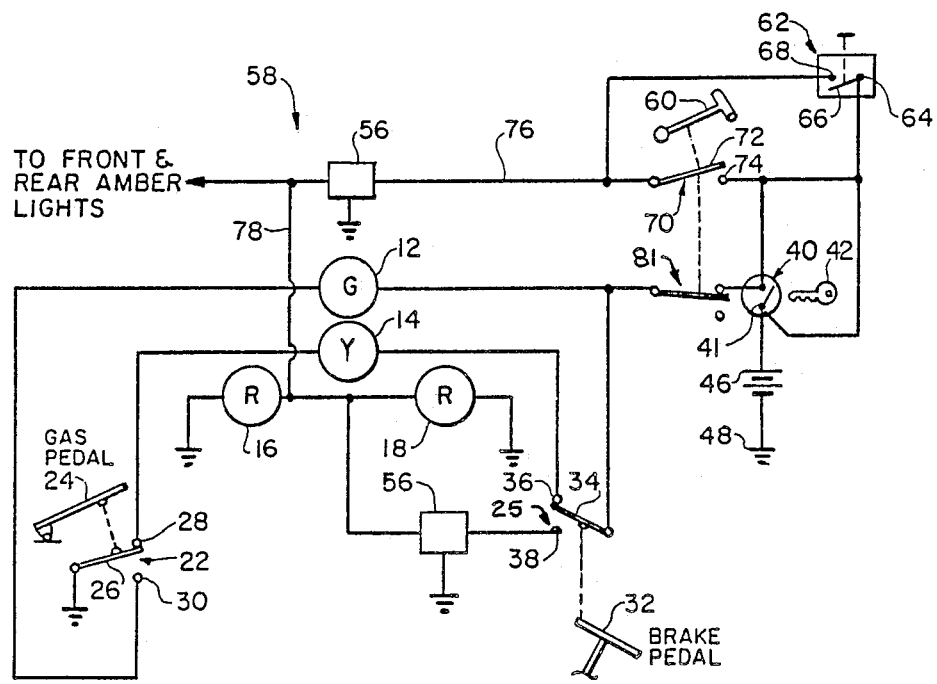

FIG. 6 discloses another embodiment of an electric circuit which also is connected to the regular automobile light system in such a way that all the lights in the vehicle including the red auxiliary lights on the rear window of the car start to blink when the brakes are pressed, or when the gear shift lever is put in reverse.

Figure 1:
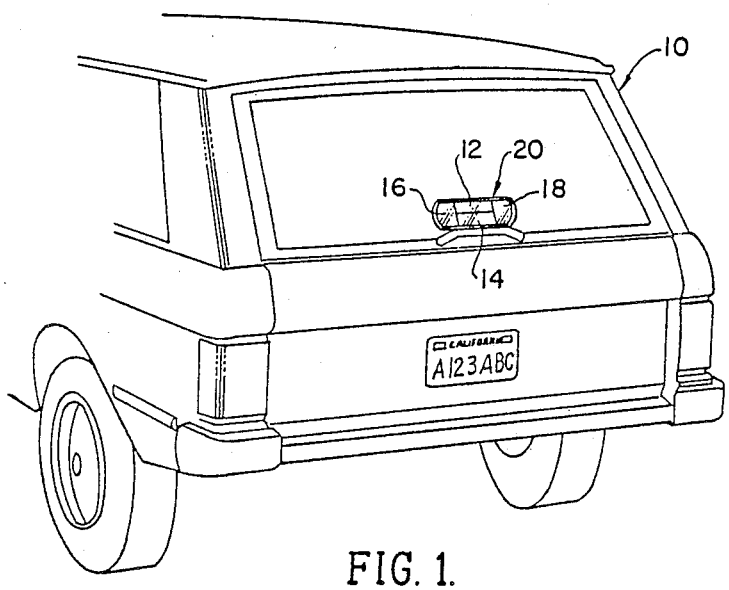
Figure 2:
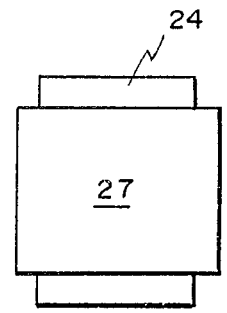
FIG. 2 is a plan view of the flexible covering enclosing the switches in the electric circuit.
Figure 3:
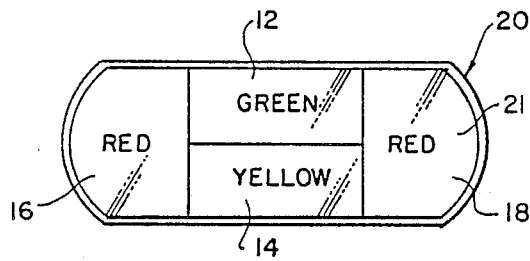
FIG. 3 is an elevational view of all the auxiliary signaling lights mounted in a single housing.

Referring now to FIG. 1 of the drawings, the rear of a motor vehicle 10 has a plurality of auxiliary indicator lights 12, 14, 16, and 18 mounted on its rear window. Light 12 is green and when lit indicates to following drivers that the motor vehicle is proceeding ahead in a normal manner. Indicator light 14 is yellow or amber and when it is lit it indicates that the driver of the motor vehicle 10 has taken his foot off the accelerator pedal and is in process of either braking, or accelerating again. Red lights 16 and 18 indicate to the following vehicles that the car is braking.

In the embodiment shown in FIG. 4, the auxiliary lights are mounted in a housing 20 which adheres to the inner surface of the rear window of the vehicle 10 by means of mastic edge around its periphery. The segments of the glass or plastic lenses 21 covering the rear of housing 20 may be colored red, green, or yellow.

The electric circuit 23 as shown in FIG. 4 accomplishes the warning signaling sequence as described above. To removably attach this circuit to an existing motor vehicle, the switches which are enclosed in a tough flexible envelope are temporarily or permanently attached to the face of the brake and accelerator pedals. When the pedals are pressed, the switches inside the envelope are actuated thereby operating the circuit shown in FIG. 4.

Referring again to FIG. 4 it is seen that the blade 26 of switch 22 mounted on the accelerator pedal 24 is grounded. The switch blade 26 normally engages terminal 28. But when the accelerator pedal is pressed, the switch blade moves form terminal 28 to terminal 30.

The blade 34 normally engages terminal 36 leading to the yellow or amber light 14 if the brake pedal is not being depressed. When the brake pedal 32 is depressed the switch blade 34 moves to terminal 38 enabling the positive terminal of the battery 46 to energize the red brake lights 16 and 18.

In operation, when the ignition switch 40 is closed the positive side of the battery 46 is grounded at terminal 48. Thus the current passes through wire 44 to terminal 36 which is connected to the yellow or amber light 14 which is grounded by switch blade 26 causing the yellow or amber light to go on when the ignition switch 40 is turned on. When the accelerator pedal 24 is pressed, the grounded switch blade 26 leaves terminal 28 and moves to terminal or contacts 30. When this happens, the connection to ground of the amber or yellow light 14 is broken. However the positive side of the battery 46 is connected to the green light 12 through line 50. This light is grounded by switch blade 26 causing the green light 12 to turn on when the accelerator or gas pedal 24 is pressed.

In operation so far, when the ignition switch 40 is turned on, the amber light 14 goes on, indicating that the driver of vehicle 10 has started his motor, or if the vehicle 10 is in motion, it warns the vehicles following behind that for some reason the driver of vehicle 10 has taken his foot off the accelerator pedal 24. Subsequently if the driver of vehicle 10 then puts his foot back on the accelerator pedal 24, the switch blade 26 retracts from terminal 28 and reengages terminal 30 causing the amber light 14 to go off and the green light to illuminate. This indicates to motorists behind, that the driver of vehicle 10 is maintaining his speed and more specifically that the road ahead is free from obstructions or other vehicles.

However when the driver of vehicle 10 applies his brakes by pressing brake pedal 32, he must first remove his foot from the accelerator pedal 24. At this time, a spring, (not shown) causes the gas pedal 24 to return to its normal position so that switch blade 26 engages terminal 28. Subsequently, when the driver of motor vehicle presses the brake pedal 32, switch blade 34 controlled by the brake pedal 32 moves from terminal 36 to terminal 38 so the positive side of the battery is connected to lines 52 and to the grounded red lights 16 and 18 causing them to illuminate.

The drivers of automobiles following vehicle 10 will see the following sequence of signal lights. When the vehicle is moving and brakes are applied. First the green light goes out, then the yellow or amber warning light 14 goes on briefly, until the brake pedal is depressed. Then the red lights go on, and the yellow or amber warning lights go off, similar to the lighting sequence of street traffic lights.

The modified circuit 54 shown in FIG. 5 is similar to the circuit shown in FIG. 5, except that a blinking circuit 56 has been interposed between terminal 38 of the switch blade 34 in switch 22 mounted on the brake pedal 32 and the red lights 16 and 18. In this way when the brake pedal is depressed, the auxiliary red lights 16 and 18 will automatically blink on and off to clearly warn motorists behind by the contrast from on to off and on again, that the driver of motor vehicle 10 is braking. This lighting arrangement is easier to see in comparison to prior devices which merely intensified the illumination of the red lights in the braking system. It is also contemplated that by proper circuit design, in a manner well known in the art, the same blinking circuit 56 built into the motor vehicle 10 can be used as indicated in FIG. 6 to cause the red auxiliary signal lights to flash. It may be more economical to simply add a conventional blinking circuit 56 as shown in FIG. 6.

The circuit 58 shown in FIG. 6 differs from the prior signaling circuits 23 and 54 shown in FIGS. 4 and 5 by an additional feature that causes the front and rear amber factory installed amber lights built into the car and the red auxiliary lights 16 and 18 to go on and blink whenever the gear shift lever 60 is moved to the reverse drive position. This makes the intention of the driver of the motor vehicle 10 more evident to persons or vehicles in front of or in back of vehicle 10 that the motor vehicle 10 is either stopping or moving in a reverse direction. It is also contemplated that instead of connecting the circuit 58 to the built in automobile amber lights at terminal 64, the circuit 58 could be wired to cause all the car lights front and rear to go on and blink simultaneously by connecting them to terminal 64 in a manner well known in the art. This arrangement would make the condition of the car much more visible to pedestrians, and to the drivers of other vehicles.

Referring now to FIG. 6, the circuit 58 operates as follows:

The positive side 41 of the ignition switch 40 is connected directly to terminal 64 of the built in automobile blinker switch 62 which is usually mounted on the steering wheel shaft, (not shown). When the hazard or blinker switch 62 is closed, switch blade 66 of the blinker switch 62 engages terminal 68 which is connected to the blinker circuit 56 through wire 76. In this way the blinker switch 62 can turn on the built-in front and rear amber lights, independently of the position of the ignition switch 40. In addition, as shown in FIG. 6, when the blinker switch is turned on it also causes the auxiliary red braking lights to go on because the output of the blinker circuit 56 is connected to the auxiliary red lights through line 78.

When the hazard switch 62 is open and the gear shift lever is not in reverse, the blinker circuit 56 cannot operate. But when the gear shift lever 60 is moved into the reverse position, the hazard switch 62 is bypassed. In this position, a switch 70 mechanically or electrically operated by the gear shift lever 60 closes. Switch 70 is mechanically or electrically connected to a switch 81 which opens when switch 70 closes or vice versa. When switch 79 opens, the auxiliary lights 12 and 14 are disconnected from the circuit, leaving only the red warning lights 16 and 18 operative. When this occurs, as stated above, the built in hazard blinker switch 62 is shorted out because the switch blade 72 of switch 70 engages terminal 74 on line 76. In this way all or just the amber lights of the motor vehicle (depending on the connection of the vehicle lights to circuit 58) go on and blink thereby warning other traffic that the vehicle is doing something unusual and possibly hazardous, e.g. backing up. In addition, as shown in FIG. 6, line 76 goes to the blinker circuit 56 and the blinker circuit is connected through line 78 to the auxiliary red lights 16 and 18. In this way, when the gear shift lever 60 is moved to the reverse position, the car lights and the auxiliary red lights 16 and 18 go on and blink automatically.

Having described the invention, what I claim as new is:

1. In an auxiliary signaling device which can be attached to the rear of a motor vehicle having an accelerator pedal and a brake pedal, comprising a plurality of auxiliary battery operated indicator lights including brake lights, said lights adapted to be detachably mounted on the rear of a vehicle, an electric circuit connected between said auxiliary lights and the battery of the motor vehicle controlling said lights so that when the battery of the motor vehicle is connected to said electric circuit and depending on the pedal that is pressed, one of the auxiliary lights turns on to indicate that the motor vehicle is on, or that the driver of the motor vehicle has taken his foot off the accelerator pedal, when the driver puts his foot on the accelerator pedal, then said one light goes off and another of the auxiliary lights turns on to indicate that the road ahead is clear, and when the brake pedal is pressed, said one light and said another light go off and the brake lights go on to indicate that the driver of the motor vehicle is applying his brakes, and a blinder circuit attached to said electric circuit in such a way that said auxiliary brake lights blink on and off to capture the attention of motorists to the rear that the vehicle is stopping, and said vehicle having a gear shift, a switch associated with said gear shift and connected to said auxiliary signaling device so that when the driver of the motor vehicle shifts into reverse gear, said switch is actuated causing the auxiliary brake lights and at least the front and rear built in amber lights of the motor vehicle to begin to blink to warn oncoming motorists and pedestrians of a hazardous situation.

2. In an auxiliary signaling device which can be attached to the rear of a motor vehicle having an accelerator pedal and a brake pedal, comprising a plurality of auxiliary battery operated indicator lights including brake lights, said lights adapted to be detachably mounted on the rear of a vehicle, an electric circuit connected between said auxiliary lights and the battery of the motor vehicle controlling said lights so that when the battery of the motor vehicle is connected to said electric circuit and depending on the pedal that is pressed, one of the auxiliary lights turns on to indicate that the motor vehicle is on, or that the driver of the motor vehicle has taken his foot off the accelerator pedal, when the driver puts his foot on the accelerator pedal, then said one auxiliary light goes off and another of the auxiliary lights turns on to indicate that the road ahead is clear, and when the brake pedal is pressed, said one auxiliary light and said another auxiliary light go off and the vehicle's brake lights go on to indicate that the driver of the motor vehicle is applying the brakes, and a blinder circuit attached to said electric circuit in such a way that said auxiliary brake lights blink on and off to capture the attention of motorists to the rear that the vehicle is stopping, and said vehicle having a gear shift, a switch associated with said gear shift and connected to said auxiliary signaling device so that when the driver of the motor vehicle shifts into reverse gear, said switch is actuated causing the auxiliary brake lights and at least the front and rear built in amber lights of the motor vehicle to begin to blink to warn oncoming motorists and pedestrians of a hazardous situation, and in addition, causing the rear auxiliary brake lights to go on along with the front and rear amber lights to better warn both oncoming motorists and motorists to the rear that the brakes are being applied.

3. The auxiliary signaling device described in claim 2 wherein when the driver of the motor vehicle applies his brakes, a second switch associated with the brake pedal is connected to the vehicle's lighting system in such a way that all the lights in the vehicle, both front and rear, and the auxiliary lights start to blink to warn oncoming motorists and motorists of the rear of the motor vehicle that a hazardous situation may be occurring.

4. In an auxiliary signaling device which can be detachably attached to the rear of a trailer pulled by a motor vehicle, comprising a plurality of auxiliary battery operated indicator lights mounted in a single housing, said motor vehicle having an accelerator pedal and brake pedal, said auxiliary lights mounted in said single housing and adapted to be detachably mounted on the rear of the trailer, an electric circuit connected between said auxiliary lights, the battery of the motor vehicle, and the trailer on which said housing is mounted, switches mounted on the brake and accelerator pedals of the motor vehicle controlling said auxiliary lights in said housing when the brake pedal or the accelerator pedal is pressed, so that when the battery of the motor vehicle is connected to said electric circuit, and depending on the pedal that is pressed, one of the auxiliary lights turns on to indicate that the motor vehicle is on or that the driver of the motor vehicle has taken his foot off the accelerator pedal, and when the driver puts his foot on the accelerator pedal, then said one auxiliary light goes off and another of the auxiliary lights goes on to indicate that the road ahead is clear, and when the brake pedal is pressed, said one auxiliary light and said another auxiliary light goes off and at least the vehicle's brake lights go on to indicate that the driver is applying the brakes, said motor vehicle having a gear shift lever movable into a reverse position, switch means mounted on the gear shift lever in such a way that when the driver of the motor vehicle shifts the gear shift lever into a reverse gear, said switch mean is closed, said switch means connected to said circuit in such a way that when said switch means is closed, all the motor vehiucle's lights, both front and rear, and all the auxiliary lights blink to more clearly warn oncoming motorists and motorists to the rear of the vehicle of a hazardous condition.

* * * * *

UNITED STATES PATENT AND TRADEMARK OFFICE
CERTIFICATE OF CORRECTION

PATENT NO.   : 4,970,493

DATED        : November 13, 1990

INVENTOR(S)  : KI T. YIM

It is certified that error appears in the above-identified patent and that said Letters Patent is hereby corrected as shown below:

The errors in the claims were the fault of the patent office col. 6 lines 6 and 37, the word "blinder" is in error. The case was written as "blinker circuit" on those pages.

In the abstract on the front page line before the word "red" insert the word --the--
Same line cancel "blinks on and off" and substitute --turns on--
Column 2 lines 19 to 21 cancel "In addition ...driver" and substitute --In addition, the existing vehicles do not adequately warn the intention of the driver to oncoming motorists and following motorists.
Column 2 line 30 after "switch" insert a period.,
Column 2 lines 31 and 32 cancel "does not appear" and substitute --is not apparent--

Signed and Sealed this

Fifth Day of May, 1992

Attest:

DOUGLAS B. COMER

*Attesting Officer*   Acting Commissioner of Patents and Trademarks